United States Patent [19]

Huebner et al.

[11] Patent Number: 4,567,231
[45] Date of Patent: Jan. 28, 1986

[54] EMULSIONS OF REINFORCED POLYDIORGANOSILOXANE LATEX

[75] Inventors: David J. Huebner; John C. Saam, both of Midland, Mich.

[73] Assignee: Dow Corning Corporation, Midland, Mich.

[21] Appl. No.: 624,546

[22] Filed: Jun. 25, 1984

[51] Int. Cl.$^4$ .................... C08L 83/00; C08K 3/34; C08F 2/32; C08L 83/06
[52] U.S. Cl. .................. 524/837; 523/312; 523/334; 524/156; 524/158; 524/501; 524/588; 524/745; 524/747; 524/801; 525/100; 525/102; 525/106
[58] Field of Search ............... 524/801, 501, 588, 837, 524/745, 747, 156, 158; 523/312, 334; 525/100, 102, 106

[56] References Cited

U.S. PATENT DOCUMENTS

| | | | |
|---|---|---|---|
| 3,294,725 | 12/1966 | Findley et al. | 524/745 |
| 3,360,491 | 12/1967 | Axon | 260/29.2 |
| 3,697,469 | 10/1972 | Ikoma | 260/29.2 M |
| 3,706,695 | 12/1972 | Huebner et al. | 524/745 |
| 4,066,594 | 1/1978 | Moeller | 524/724 |
| 4,248,751 | 2/1981 | Willing | 524/588 |
| 4,273,634 | 6/1981 | Saam et al. | 524/588 |
| 4,273,813 | 6/1981 | Meddaugh | 427/387 |
| 4,288,356 | 9/1981 | Huebner et al. | 524/501 |
| 4,431,982 | 2/1984 | Monroe et al. | 524/860 |

*Primary Examiner*—Herbert J. Lilling
*Attorney, Agent, or Firm*—Edward C. Elliott

[57] ABSTRACT

This invention is a method of producing a latex of crosslinked polydiorganosiloxane reinforced with colloidal silica. The method allows the production of a latex having a relatively high amount of silica present in relation to the polymer because the water used to form the emulsion can be that present in the acidic colloidal silica sol used in the method. The high solids latex can be useful as a caulking material. The method homogenizes a hydroxyl endblocked polydiorganosiloxane, a silane of the formula $R'_a Si(OR^3)_{4-a}$ where $R'$ is a monovalent hydrocarbon radical of up to 12 carbon atoms, $R^3$ is an alkyl radical of 1 to 6 carbon atoms, a partial hydrolyzate, or mixture of silane and hydrolyzate, and a is 0 or 1; a surface active anionic catalyst of the formulae $R^2C_6H_4SO_3H$ wherein $R^2$ is a monovalent hydrocarbon radical of at least 6 carbon atoms, $R^2OSO_2OH$, or

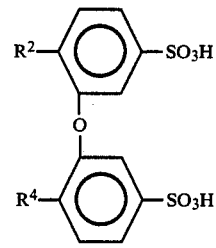

wherein $R^4$ is H or $R^2$; and greater than 1 part by weight of colloidal silica present as an acidic sol in water. This homogenized mixture is an oil-in-water emulsion. This emulsion is maintained at a temperature of 15° to 30° C. for at least 5 hours at a pH of less than 5 until a crosslinked polymer is formed. The product is a latex which produces an elastomer upon removal of the water at room temperature. Shelf stable products are produced by adjusting the pH to from 7 to 12.5.

21 Claims, No Drawings

EMULSIONS OF REINFORCED POLYDIORGANOSILOXANE LATEX

BACKGRTOUND OF THE INVENTION

1. Field of the Invention

This invention relates to a method of making aqueous emulsions of crosslinked polydiorganosiloxanes which yield reinforced elastomers.

2. Background Information

A method of polymerizing siloxanes and silcarbanes in emulsion by using a surface active sulfonic acid catalyst is disclosed by Findlay and Weyenberg in U.S. Pat. No. 3,294,725, issued Dec. 27, 1966. Their method, which comprises polymerizing and copolymerizing at least one member selected from organosiloxanes of the unit formula $R_nSiO_{4-n/2}$ and silcarbanes having the general formula $HO(R)_2SiQSi(R)_2OH$ in an aqueous medium while in the dispersed state, in the presence of a compound of the formula $R'C_6H_4SO_3H$ as the primary catalyst for the polymerization until the desired increase in molecular aggregation is obtained. These emulsions are stated to be characterized by extreme stability and extremely fine particle size. The products produced were higher molecular weight fluids or solids. In the particular embodiment in which the starting siloxane has a formula

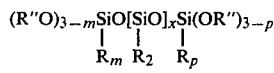

it is stated that the product, after neutralization, is a polysiloxane which does not appear gelled but when removed from the emulsion, does gel to a crosslinked rubber. Fillers can be added to the emulsion so that the strength of the rubber resulting from coagulation of the emulsion is further improved.

Axon discloses a method of polymerizing siloxanes and silcarbanes in emulsion employing organic sulfates of the general formula $R'OSO_2OH$ in U.S. Pat. No. 3,360,491, issued Dec. 26, 1967. His method comprises polymerizing and copolymerizing at least one member of the group consisting of organosiloxanes of the unit formula $R_nSiO_{4-n/2}$ and silcarbanes having the general formula $HO(R)_2SiQSi(R)_2OH$ by polymerizing in an aqueous medium while in a dispersed state in the presence of a compound of the formula $R'OSO_2OH$ until the desired increase in molecular aggregation is obtained. The emulsions are stated as being suitable for release agents and for coating compositions. His embodiment prepared from an alkylalkoxysiloxy endblocked diorganosiloxane is stated as polymerizing to a polysiloxane which does not appear to be gelled, but which when removed from the emulsion, does gel to a crosslinked rubber. Fillers can be added to the emulsion to improve the strength of the rubber resulting from the coagulation of the emulsion. The reinforced emulsion system provides an excellent method of obtaining coatings of tough rubbery siloxane films for release coatings.

A method for emulsion polymerization of organosiloxanes is disclosed by Ikoma in U.S. Pat. No. 3,697,469, issued Oct. 10, 1972. His method emulsifies, in water containing a salt-type anionic surface active agent, an organosiloxane having the unit formula $R_aSiO_{4-a/2}$ and then contacting said emulsion with an acid-type cationic exchange resin. The ion exchange converts the salt-type surface active agent to an acid-type thereby starting polymerization of the organosiloxane by making the emulsion an acid medium with a pH value of less than 4. The method is shown to polymerize organocyclosiloxanes, polysiloxane fluids, mixtures of organocyclosiloxanes and alkylalkoxysilanes, mixtures of organocyclosiloxanes and polysiloxane fluids, and alkylalkoxysilanes to give emulsions of polysiloxanes of increased viscosity. The emulsions are useful as coatings to give release properties, lubricants for textiles, and water repellent for textiles. An example combining an organocyclosiloxane and alkyltrialkoxysilane and polymerizing, then mixing the polymerized emulsion with a 10 percent sol of fine silica particles and dibutyltindioctoate emulsion gave a sheet upon drying which was a rubber.

A method of preparing an electrically conductive silicone emulsion is disclosed by Huebner and Meddaugh in U.S. Pat. No. 3,706,695, issued Dec. 19, 1972. The method dissolves a surface active sulfonic acid in water, mixes in a siloxane fluid and homogenizes the mixture to provide a stable dispersion. The dispersion is heated for at least one hour to polymerize the siloxanes, then adds a nonionic emulsifying agent and neutralizes the acid to give a pH of 6.5 to 9. Finely divided carbon black, a metallic salt of a carboxylic acid and a silane of the formula $RSi(OR')_3$ are then mixed into the emulsion. When the emulsion is applied to a substrate and dried, a heat stable electrically conductive silicone rubber is formed. Satisfactory cure is obtained for a period of about two weeks after mixing. The curability can be restored by adding additional catalyst, alkoxysilane or both.

SUMMARY OF THE INVENTION

This invention relates to a method of producing a latex of crosslinked polydiorganosiloxane having reinforcement derived from an acidic colloidal silica sol. The latex is prepared by combining a mixture of hydroxyl endblocked polydiorganosiloxane; a silane of the formula $R'_aSi(OR^3)_{4-a}$ where $R'$ is a monovalent hydrocarbon radical having up to 12 carbon atoms, $R^3$ is an alkyl radical having from 1 to 6 inclusive carbon atoms, and $a$ is 0 or 1; a surface active anionic catalyst of the formula $R^2C_6H_4SO_4H$ wherein $R^2$ is a monovalent hydrocarbon radical of at least 6 carbon atoms, of the formula $R^2OSO_2OH$, or of the formula

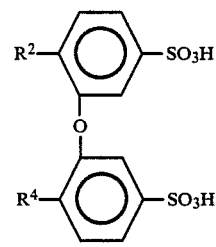

wherein $R^4$ is H or $R^2$; and greater than 1 part by weight of colloidal silica present as an acidic sol in water. This mixture is immediately homogenized to yield an oil-in-water emulsion. The emulsion is maintained at a temperature of from 15° to 30° C. for at least 5 hours at a pH of less than 5 until a crosslinked polymer is formed. The product is a latex which produces a reinforced elastomer upon removal of the water at room temperature.

The method of this invention yields a latex which can be utilized immediately after manufacture to yield reinforced crosslinked silicone elastomers. The latex yields a reinforced elastomer upon removal of the water, no further curing is required. The method yields a latex which can be stored for a period of months without significant change in its properties.

The method of this invention adds an acidic colloidal silica sol to the mixture before homogenization. By using the water present in the acidic silica sol as the primary source of water, it is possible to prepare latexes of crosslinked polymer having high solids content, 70 percent solids by weight for instance. Solids are defined as the percent by weight of the emulsion remaining after exposure of the emulsion to the atmosphere, to remove the water, for a period of time to approach equilibrium; 7 days at 50 percent relative humidity and 70° F. is typical. This emulsion can be stored for a period of a few weeks at acidic conditions or for longer periods of time when adjusted to a pH of greater than 7 by the addition of a basic material.

DESCRIPTION OF THE INVENTION

This invention relates to a method of producing an aqueous latex of crosslinked polydiorganosiloxane consisting essentially of (A) homogenizing immediately after admixing a mixture consisting essentially of (1) 100 parts by weight of polydiorganosiloxane of the formula $$HO(R_2SiO)_xH$$

wherein each R is a radical selected from the group consisting of methyl, ethyl, propyl, phenyl, vinyl, allyl, and 3,3,3-trifluoropropyl, and x is an average value in the range of from 3 to 100 inclusive, (2) 0.5 to 15 parts by weight of an alkoxy silicon compound selected from the group consisting of silane of the formula $$R'_aSi(OR^3)_{4-a}$$

where R' is a monovalent hydrocarbon radical having up to 12 carbon atoms, $R^3$ is an alkyl radical having from 1 to 6 inclusive carbon atoms, and a is 0 or 1, a partial hydrolyzates thereof where the partial hydrolyzate is soluble in the polydiorganosiloxane (1), and mixtures of silane and partial hydrolyzate; (3) from 15 to 100 millimoles of surface active anionic catalyst per kilogram of polydiorganosiloxane, where said catalyst is selected from the group consisting of a compound of the formula $R^2C_6H_4SO_3H$ wherein $R^2$ is a monovalent hydrocarbon radical of at least 6 carbon atoms, a compound of the formula $R^2{}_{OSO_2}OH$ wherein $R^2$ is as defined above, a compound of the formula

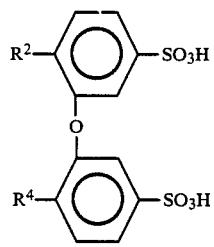

wherein $R^2$ is as defined above and $R^4$ is hydrogen or $R^2$, and mixtures thereof; and (4) greater than 1 part by weight of colloidal silica present as an acidic sol in water to yield an oil-in-water emulsion, then (B) maintaining the emulsion produced in (A) at a temperature of from 15° to 30° C. for at least 5 hours at a pH of less than 5 until a crosslinked polymer is formed, to yield a latex which produces a reinforced elastomer upon removal of the water at room temperature.

This inventive method produces a latex which contains crosslinked polydimethylsiloxane combined with colloidal silica. The latex yields useful elastomers upon evaporation of the water. The method of this invention can yield a latex having a greater amount of reinforcing colloidal silica than is possible with other similar methods of producing silicone latex. As used herein, an elastomer comprises the crosslinked polymer particles and reinforcing colloidal silica or silsesquioxane as a material that has a useful tensile strength, stretches under tension, and retracts rapidly to recover its original dimensions.

The latices of this invention do not contain a metallic catalyst because the crosslinked polymer is readily formed in the emulsion without such a catalyst. Because no metallic catalyst is necessary, there is no problem with a catalyst continuing to cause crosslinking during storage of the latex and causing a change of physical properties of the elastomer after varying times of storage. Because there is no metallic catalyst, the heat stability of the resulting elastomer is expected to be superior to those products containing an active catalyst such as a tin compound. Because there is no metallic catalyst present, the elastomer produced by the method of this invention is expected to have a low toxicity.

The hydroxyl endblocked polydiorganosiloxanes used in the method of this invention are well known in the art. The hydroxyl endblocked polydiorganosiloxane can be any of the polydiorganosiloxanes endblocked with hydroxyl radicals and can be represented by the formula $$HO(R_2SiO)_xH$$

where each R is a radical selected from the group consisting of methyl, ethyl, propyl, phenyl, vinyl, allyl, and 3,3,3-trifluoropropyl, and mixtures thereof wherein at least 50 percent of the radicals are methyl radicals. The polydiorganosiloxane can be a single type polymer with the same kind of repeating diorganosiloxane units or it can be a combination of two or more kinds of repeating diorganosiloxane units, such as combinations of dimethylsiloxane units and methylphenylsiloxane units. The polydiorganosiloxane can also be a mixture of two or more kinds of polydiorganosiloxanes. The polydiorganosiloxanes are those in which x is an average value in the range of from 3 to 100 inclusive. The preferred polydiorganosiloxanes are those in which x is at least large enough that the viscosity of the polydiorganosiloxane is at least 0.05 Pa.s at 25° C. ( x is about 25). A preferred polydiorganosiloxane is a polydimethylsiloxane having a viscosity of from about 0.05 Pa.s to 0.15 Pa.s at 25° C., the value of x for such a material being from about 25 to 80.

The alkoxy silicon compound used in the method of this invention is selected from the group consisting of silane of the formula $$R'_aSi(OR^3)_{4-a}$$

where R' is a monovalent hydrocarbon radical having up to 12 carbon atoms, $R^3$ is an alkyl radical having from 1 to 6 inclusive carbon atoms, and a is 0 or 1; a partial hydrolyzate of the silane where the partial hydrolyzate is soluble in the polydiorganosiloxane (1); and mixtures of the silane and the partial hydrolyzate. These alkoxy silicon compounds are well-known in the art and many are commercially available. R' can be illustrated by radicals such as methyl, ethyl, propyl, isopropyl, butyl, hexyl, dodecyl, vinyl, allyl, phenyl, tolyl, and 3,3,3-trifluoropropyl. $R^3$ is an alkyl radical such as methyl, ethyl, propyl, and hexyl. Preferably both R' and $R^3$ are methyl. Preferred silanes include methyltrimethoxysilane and ethylorthosilicate with ethylorthosilicate most preferred. A preferred partial hydrolyzate of silane is ethylpolysilicate.

The amount of alkoxy silicon compound present can vary from 0.5 to 15 parts by weight based upon 100 parts by weight of the hydroxyl endblocked polydiorganosiloxane with a preferred amount of from 1 to 5 parts by weight. The amount of alkoxy silicon compound used has an effect upon the degree of crosslinking in the emulsion polymer. The preferred amount of crosslinker is dependent upon the hydroxyl endblocked polydiorganosiloxane used, the alkoxy silicon compound used, the time allowed for reaction, and the type and amount of surface active anionic catalyst. The preferred amount of crosslinker is determined by the users physical property requirements, in particular, how much elongation is desired in the elastomer produced. Higher amounts of alkoxy silicon compound cause more crosslinking so that the elongation of the elastomer falls to lower values.

The method of this invention uses a surface active anionic catalyst to form the emulsion and to catalyze the reaction of the hydroxly endblocked polydiorganosiloxane and the alkoxy silicon compound. The surface active anionic catalyst is selected from the group consisting of a compound of the formula $R^2C_6H_4SO_3H$ wherein $R^2$ is a monovalent hydrocarbon radical of at least 6 carbon atoms; a compound of the formula $R^2OSO_2OH$ wherein $R^2$ is as defined above; a compound of the formula

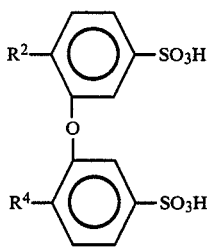

wherein $R^2$ is as defined above and $R^4$ is H or $R^2$, and mixtures thereof. $R^2$ contains at least 6 carbon atoms, and preferably no more than about 18 carbon atoms. $R^2$ includes hexyl, octyl, decyl, dodecyl, cetyl, myricyl, nonenyl, phytyl, and pentadecadienyl radicals. Most preferably $R^2$ has at least 10 carbon atoms. Preferred is the dodecyl radical.

The surface active anionic catalyst as used in this invention performs a dual function. The catalyst must function as a surfactant so that the hydroxyl endblocked polydiorganosiloxane is properly emulsified to form the oil-in-water emulsion. In such an emulsion, the surfactant forms a layer over the surface of the polydiorganosiloxane particles and keeps them from coalescing. The surfactant on the surface of the particles also acts as a catalyst in the reaction between the hydroxyl endblocked polydiorganosiloxane and the alkoxy silicon compound to crosslink the polydiorganosiloxane in the particles. More than 1 type of surface active anionic catalyst can be used.

The sulfonic acids are available commercial products. The preferred sulfonic acids are dodecylbenzene sulfonic acid and dodecyldiphenyloxidedisulfonic acid. Hydrogen lauryl sulfate may be obtained by dissolving sodium lauryl sulfate in water, then adding hydrogen chloride to form the hydrogen lauryl sulfate and sodium chloride. Another method treats the sodium lauryl sulfate solution with a cation exchange resin which exchanges sodium ion for hydrogen ion. The solution of hydrogen lauryl sulfate is then used as the catalyst in the method of this invention. The hydrogen lauryl sulfate can also be produced in situ by homogenizing the polydiorganosiloxane, alkoxy silicon compound, and the acidic colloidal silica sol with sodium lauryl sulfate, then adding hydrogen chloride to the emulsion formed by the homogenization to convert the sodium lauryl sulfate to hydrogen lauryl sulfate catalyst. This in situ process is considered to fall within the scope of the claims.

The preferred amount of surface active anionic catalyst is slightly more than enough to saturate the surfaces of the emulsion polymer particles. For instance, with the procedure used in the examples, the emulsion particles have an average diameter of about 0.22 micrometre which would require about 89 millimoles of dodecylbenzene sulfonic acid per kilogram of polydimethylsiloxane.

The surface active anionic catalyst used and the amount used have an effect upon the physical properties of the elastomer produced from the latex formed following the method of this invention. When an excess of dodecylbenzene sulfonic acid was used much beyond that required to cover the polymer particles, the elastomers formed from the latex showed a decrease in tensile strength and initial modulus and an increase in elongation at break. When the amount of dodecylbenzene sulfonic acid was reduced to 20 percent of that required, the resulting elastomer had properties too low to properly measure. When dodecylbenzene sulfonic acid was replaced by hydrogen lauryl sulfate, the resulting elastomer had an initial modulus increase of five-fold and a four-fold reduction in percent elongation at break. The tensile strength remained about the same. Because the amount of surface active anionic catalyst appears to be related to the size of the particles of polydiorganosiloxane present in the emulsion, the amount of catalyst used depends upon the size of the particles. The preferred amount of surface active anionic catalyst found in this invention is calculated upon the consideration that the particles and polydiorganosiloxane in the emulsion are about 0.2 micrometre average diameter.

The emulsion of crosslinked polydiorganosiloxane of this invention is reinforced by the greater than 1 part by weight of colloidal silica sol, per 100 parts by weight of hydroxyl endblocked polydiorganosiloxane, in the form of an acidic sol in water present in the latex. Without reinforcement, the elastomer film formed from the emulsion is weak. The acidic silica sols are commercially available dispersions of colloidal silica in water. They have a pH of about 3. A typical sol contains about 34 percent by weight of colloidal silica having an average particle size of about 20 nanometers, with a pH of about 3.2. As the amount of colloidal silica used to reinforce the emulsion is increased, the initial modulus of elasticity remains nearly constant for amounts above 10 parts by weight colloidal silica per 100 parts by weight of polydiorganosiloxane.

The method of this invention is particularly adopted to make use of colloidal silica in the form of an acidic sol in water. By using the water in the sol as the water to form the emulsion of polydiorganosiloxane and alkoxy silicon compound, the latex produced can have a higher total solids content than if the polydiorganosiloxane and alkoxy silicon compound were hydrolyzed and polymerized, then reinforced by adding a colloidal silica sol.

The method of this invention first combines a low molecular weight hydroxyl endblocked polydiorganosiloxane fluid as described above, an alkoxy silicon compound, a surface active anionic catalyst, and an acidic colloidal silica sol. These ingredients are stirred together to form a uniform mixture, then are homogenized immediately after mixing by passing the mixture through a colloid mill or other known means of producing homogenized material. The homogenized material is in the form of an oil-in-water emulsion, that is, an emulsion of particles of polydiorganosiloxane dispersed in water. Sufficient water is present to allow the formation of an oil-in-water emulsion. The preferred amount of water is at least 20 percent by weight of the emulsion with about 25 to 50 percent by weight most preferred. This emulsion, formed by homogenizing the mixture, is stable on standing; that is, it does not cream or precipitate. The emulsion contains particles having an average diameter of about 225 nanometers. Upon standing at a temperature of from 15° to 30° C., the ingredients react so that the polydiorganosiloxane becomes crosslinked. During this polymerization, the ph is below 5. The polymerization is allowed to continue for at least 5 hours. It is thought that the polymerization proceeds first by chain extension, then by a combination of polymerization and crosslinking to yield particles of higher molecular weight crosslinked polymer. The extent and rate of polymerization or reaction between the polydiorganosiloxane and the alkoxy silicon compound are affected by several parameters such as the type and amount of alkoxy silicon compound and the type and amount of surface active anionic catalyst. The desired degree of crosslinking is determined by experiment. A series of samples are taken from the emulsion while it is reacting. The reaction is halted by admixing base to raise the pH to greater than 7; typically about 10. Each sample is then mixed with a standard amount of colloidal silica sol, a film of the latex is layed down, and the film dried. The physical properties of the elastomer produced by drying the film are measured. A plot of the measured physical properties versus the time of reaction is prepared and used to determine the reaction time necessary to provide the physical properties considered optimum by the experimentor. The preferred time for reaction, when using ethylorthosilicate as the alkoxy silicon compound, is about 12 hours, when 70 millimoles of dodecylbenzenesulfonic acid per kilogram of polydimethylsiloxane is used as the surface active anionic catalyst, where 24 parts by weight of colloidal silica is used per 100 parts by weight of polydiorganosiloxane.

After the polymerization has proceeded as far as desired, the reaction is halted by admixing sufficient base to raise the pH of the emulsion to greater than 7. A preferred method uses a dilute aqueous solution of sodium hydroxide or ammonium hydroxide. If not neutralized, the emulsion continues to react until reaction is complete. The latex is a useful product as soon as the polymer is reacted to the preferred viscosity and amount of crosslinking. The preferred amount of reaction is a function of the intended use. For instance, if the latex is to be used as a paper coating or impregnant, only enough reaction may be required to obtain enough crosslinking to control the degree of transfer of the release coating formed upon drying. If an elastomer having a high modulus is the desired product, a higher degree of reaction would be required to obtain the necessary polymerization and crosslinking of the polydiorganosiloxane.

The pH of the emulsion is adjusted to greater than 3 after the desired degree of reaction has occurred if the pH during reaction is below 3. The acidic silica sol in the emulsion is not as stable at a pH below 3 as it is at a pH of from 3 to 7. The silica sol is most stable at a pH of about 3.1. The latex with a pH of from 3 to 7 has a useful shelf life of at least 24 hours. Elastomer films cast from acid latex have a higher initial modulus and 100 percent tensile modulus than when cast from a basic latex. The elongation at break is higher for elastomers cast from basic latex than from acidic latex. The tensile strength is about the same whether the elastomer is cast from an acidic or basic latex.

When the pH of the emulsion is adjusted to a pH of from 7 to 12.5 by admixing base, preferably a dilute solution of sodium hydroxide or ammonium hydroxide, the reaction stops or slows down to a very low rate because the catalyst (3) is not active in a basic emulsion. An emulsion at a pH of from 7 to 12.5 has good shelf life, as long as 12 months for example, and films cast from the emulsion over that period have useful physical properties as elastomers. The most stable emulsions are those having a pH of from about 9.5 to 11 in that the physical properties of elastomers cast from such emulsions have the most uniform physical properties, i.e., they show little change when prepared from different aged latexes.

The latex can be used to yield elastomeric films by coating the latex on a substrate and drying it. The latex provides an elastomer with useful properties immediately upon manufacture of the latex as well as after a storage period. The latex provides an elastomer with useful properties immediately upon drying. The physical properties of the cured elastomer have been found to change to some degree upon aging after drying of the elastomer.

If desired, additional acidic colloidal silica sol can be added to the emulsion. This additional colloidal silica sol can be added to the mixture after homogenizing step (A), after polymerization step (B), or after raising the pH step (C). The point in the method at which additional colloidal silica sol is added to the emulsion does not appear to affect the physical properties of the resulting elastomer. When additional colloidal silica sol is added after step (C), the sol can be either acidic or basic.

The physical properties of the elastomer films can be modified by the addition of surface active anionic or nonanionic surfactant after the neutralization step. This modification is especially useful in obtaining a higher elongation in the elastomer film, however, there is also some loss of tensile strength.

Additional ingredients may be added to the latex of this invention to alter the properties of the elastomer produced by drying the latex as long as they are evaluated to ensure that they do not effect the stability of the latex or its ability to cure upon removal of the water. Typical additives include other fillers, such as ground silica, pigments or dyes, and heat stability additives such as iron oxide.

The latex of this invention is useful in those applications where an elastomeric coating on a substrate is desired. The elastomer is formed by removing the water to yield a cured, crosslinked material without any curing step required. The coating can be used as a paper coating, for instance, or as a construction coating. The latex can also be cast into thick films or molded parts to form elastomeric parts. The latex produced by the method of this invention, because it can be produced at a high solids content, is particularly suited for producing latex useful as a caulking material. The latex may be combined with carbon black, graphite, or graphite fibers to yield cured films which are electrically conductive.

The following examples are presented for purposes of illustrating the invention and should not be construed as limiting the scope of the invention which is properly delineated in the claims. All parts are parts by weight.

EXAMPLE 1

An aqueous emulsion of reinforced crosslinked polydiorganosiloxane was produced using the water present in the acidic colloidal silica sol and the catalyst solution.

A mixture was prepared by combining with stirring 600 g of hydroxyl endblocked polydimethylsiloxane fluid having a viscosity of about 0.09 Pa's at 25° C. with 27 g of ethylorthosilicate. A second mixture was prepared by admixing 46 g of a 30 percent by weight solution of dodecylbenzene sulfonic acid catalyst in water and 441 g of an acidic colloidal silica sol having about 34 percent by weight colloidal silica having an average particle size of about 20 nanometers and a pH of 3.2. This second mixture was combined with the first mixture and the combined mixtures were immediately homogenized in a Gaulin Laboratory Homogenizer at a pressure of 51.7 MPa for 2 passes. The homogenized material was allowed to polymerize for 12 hours at room temperature, then was neutralized with 7.6 g of a 3 percent by weight solution of sodium hydroxide for each 100 g of the emulsion. During polymerization the emulsion had about 70 millimoles of surfactant present for each kilogram of polydimethylsiloxane. The latex was about 70 percent by weight solids.

The latex was cast into a film and dried for one week at room temperature. The resulting elastomer had a tensile strength of 1.58 megapascals and an elongation at break of 230 percent.

EXAMPLE 2

A mixture was prepared by stirring together 850 g of the hydroxyl endblocked polydimethylsiloxane fluid of Example 1, 38.3 g of ethylorthosilicate (4.5 parts by weight of alkoxy silicone compound per 100 parts by weight of polydiorganosiloxane), 768 g of water, 19.5 g of dodecylbenzenesulfonic acid (71 millimoles of catalyst per kilogram of polydiorganosiloxane), and 125 g of the acidic colloidal silica sol of Example 1 (5 parts by weight of silica per 100 parts by weight of polydiorganosiloxane). The mixture was immediately homogenized as in Example 1. The emulsion formed was then immediately divided into portions and additional amounts of the colloidal silica sol were immediately added to each portion to give the amounts of silica in each emulsion as shown in Table 1. The portions were then held at room temperature for 13.5 hours. The portions had a pH of less than 5. A part of each portion was cast into a film and allowed to dry. A part of each portion was combined with sufficient sodium hydroxide as a 3 percent by weight solution to give a pH of about 10. A film was cast from these basic latices and allowed to dry.

The films were allowed to dry at room temperature for 1 week, then were cut into test samples and tested for physical properties resulting in the values shown in the table.

The results in the table show that useful elastomers are formed when the latex is cast when acidic as well as when basic. However, the elongation at break is significantly lower when the latex is acid when cast into a film. The initial modulus and stress at 100 percent elongation are significantly higher for the films formed from the acid latex than when formed from the basic latex.

TABLE

| Parts Silica Added | | Tensile Strength | Elongation | Initial Modulus | 100% Modulus |
|---|---|---|---|---|---|
| Initial | Total | mPa | percent | mPa | mPa |
| Film Formed From Acidic Latex | | | | | |
| 0 | 5 | 5.2 | 214 | 4.9 | 3.2 |
| 5 | 10 | 11.1 | 256 | 8.1 | 5.0 |
| 10 | 15 | 10.9 | 160 | 13.1 | 9.2 |
| 15 | 20 | 13.4 | 108 | 28.5 | 13.1 |
| 20 | 25 | 16.8 | 86 | 37.3 | — |
| Film Formed From Basic Latex | | | | | |
| 0 | 5 | 3.7 | 512 | 0.3 | 0.4 |
| 5 | 10 | 7.3 | 406 | 1.2 | 1.6 |
| 10 | 15 | 11.4 | 378 | 4.1 | 3.6 |
| 15 | 20 | 13.6 | 272 | 26.8 | 6.6 |
| 20 | 25 | 18.2 | 222 | 44.2 | 11.2 |

EXAMPLE 3

The procedure of Example 2 was repeated except the polymerization time was 24 hours instead of 13.5 hours. The latex was made basic and films cast and tested as in Example 2. The resulting physical properties were not significantly different than those shown in the table.

That which is claimed:

1. A method of producing an aqueous latex of crosslinked polydiorganosiloxane consisting essentially of
   (A) homogenizing immediately after admixing, a mixture consisting essentially of
      (1) 100 parts by weight of polydiorganosiloxane of the formula HO(R$_2$SiO)$_x$H 

wherein each R is a radical selected from the group consisting of methyl, ethyl, propyl, phenyl, vinyl, allyl, and 3,3,3-trifluoropropyl, and x is an average value in the range of from 3 to 100 inclusive
      (2) 0.5 to 15 parts by weight of an alkoxy silicon compound selected from the group consisting of silane of the formula R'$_a$Si(OR$^3$)$_{4-a}$ 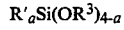

where R' is a monovalent hydrocarbon radical having up to 12 carbon atoms, R$^3$ is an alkyl radical having from 1 to 6 inclusive carbon atoms, and a is 0 or 1; a partial hydrolyzate of the silane where the partial hydrolyzate is soluble in the polydiorganosiloxane (1); and mixtures of silane and partial hydrolyzate, (3) from 15 to 100 millimoles of surface active anionic catalyst per kilogram of polydiorganosiloxane, where said catalyst is selected from the group consisting of a compound of the formula R²C₆H₄SO₃H wherein R² is a monovalent hydrocarbon radical of at least 6 carbon atoms; a compound of the formula R²OSO₂OH wherein R² is as defined above; a compound of the formula

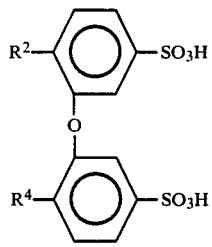

wherein R² is as defined above and R⁴ is hydrogen or R²; and mixtures thereof, and (4) greater than 1 part by weight of colloidal silica present as an acidic sol in water, to yield an oil-in-water emulsion, then (B) maintaining the emulsion produced in (A) at a temperature of from 15° to 30° C. for at least 5 hours at a pH of less than 5 until a crosslinked polymer is formed to yield a latex which produces an elastomer upon removal of the water at room temperature.

2. The method of claim 1 in which step (B) is followed by
   (C) adjusting the pH of the product of (B) to greater than 3.

3. The method of claim 1 in which step (B) is followed by
   (C) adjusting the pH of the product of (B) to from 3 to 7.

4. The method of claim 1 in which step (B) is followed by
   (C) admixing sufficient base to raise the pH of the product of (B) to from 7 to 12.5.

5. The method of claim 4 in which the pH is from 9.5 to 11.

6. The method of claim 1 in which R' is selected from the group consisting of methyl, ethyl, propyl, and phenyl and R³ is selected from the group consisting of methyl, ethyl, and propyl.

7. The method of claim 1 in which R² has an average of 12 carbon atoms.

8. The method of claim 1 in which the alkoxy silicon compound is present in an amount of from 1 to 5 parts by weight and is chosen from the group consisting of ethylorthosilicate, ethylpolysilicate, methyltrimethoxysilane, and phenyltrimethoxysilane.

9. The method of claim 8 in which the surface active agent is selected from the group consisting of dodecylbenzenesulfonic acid, hydrogenlaurylsulfate, and dodecyldiphenyloxidedisulfonic acid.

10. The method of claim 9 in which (4) is 10 to 50 parts by weight of colloidal silica.

11. The method of claim 3 in which the alkoxy silicon compound is present in an amount of from 1 to 5 parts by weight and is chosen from the group consisting of ethylorthosilicate, ethylpolysilicate, methyltrimethoxysilane, and phenyltrimethoxysilane; the surface active agent is selected from the group consisting of dodecylbenzenesulfonic acid, hydrogenlaurylsulfate, and dodecyldiphenyloxidedisulfonic acid; and (4) is 10 to 50 parts by weight of colloidal silica.

12. The method of claim 4 in which the alkoxy silicon compound is present in an amount of from 1 to 5 parts by weight and is chosen from the group consisting of ethylorthosilicate, ethylpolysilicate, methyltrimethoxysilane, and phenyltrimethoxysilane; the surface active agent is selected from the group consisting of dodecylbenzenesulfonic acid, hydrogenlaurylsulfate, and dodecyldiphenyloxidedisulfonic acid; and (4) is 10 to 50 parts by weight of colloidal silica.

13. The method of claim 5 in which the alkoxy silicon compound is present in an amount of from 1 to 5 parts by weight and is chosen from the group consisting of ethylorthosilicate, ethylpolysilicate, methyltrimethoxysilane, and phenyltrimethoxysilane; the surface active agent is selected from the group consisting of dodecylbenzenesulfonic acid, hydrogenlaurylsulfate, and dodecyldiphenyloxidedisulfonic acid; and (4) is 10 to 50 parts by weight of colloidal silica.

14. The aqueous latex produced by the method of claim 1.

15. The aqueous latex produced by the method of claim 10.

16. The aqueous latex produced by the method of claim 11.

17. The aqueous latex produced by the method of claim 13.

18. The elastomer produced by removing the water from the latex of claim 14.

19. The elastomer produced by removing the water from the latex of claim 15.

20. The elastomer produced by removing the water from the latex of claim 16.

21. The elastomer produced by removing the water from the latex of claim 17.

* * * * *

UNITED STATES PATENT AND TRADEMARK OFFICE
CERTIFICATE OF CORRECTION

PATENT NO. : 4,567,231

DATED : January 28, 1986

INVENTOR(S) : David Joel Huebner and John Carlton Saam

It is certified that error appears in the above-identified patent and that said Letters Patent is hereby corrected as shown below:

In Column 1, line 5; the word "BACKGRTOUND" should read "BACKGROUND".

In Column 2, line 46; the formula "$R^2C_6H_4SO_4H$" should read "$R^2C_6H_4SO_3H$".

In Column 3, line 51; the formula "$R^2_{OSO_2}OH$" should read "$R^2OSO_2OH$".

Signed and Sealed this

Fourth Day of November, 1986

[SEAL]

Attest:

DONALD J. QUIGG

*Attesting Officer*     *Commissioner of Patents and Trademarks*